(12) United States Patent
Pekelny et al.

(10) Patent No.: US 11,106,943 B2
(45) Date of Patent: Aug. 31, 2021

(54) MODEL-AWARE SYNTHETIC IMAGE GENERATION

(71) Applicant: Microsoft Technology Licensing, LLC, Redmond, WA (US)

(72) Inventors: Yuri Pekelny, Seattle, WA (US); Pedro Urbina Escos, Seattle, WA (US); Emanuel Shalev, Sammamish, WA (US); Di Wang, Sammamish, WA (US); Dimitrios Lymperopoulos, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 224 days.

(21) Appl. No.: 16/519,659

(22) Filed: Jul. 23, 2019

(65) Prior Publication Data

US 2021/0027107 A1 Jan. 28, 2021

(51) Int. Cl.
*G06K 9/62* (2006.01)

(52) U.S. Cl.
CPC ........ *G06K 9/6262* (2013.01); *G06K 9/6215* (2013.01); *G06K 9/6256* (2013.01)

(58) Field of Classification Search
CPC .. G06K 9/6262; G06K 9/6215; G06K 9/6256; G06N 3/0454; G06N 3/084
See application file for complete search history.

(56) References Cited

U.S. PATENT DOCUMENTS

| | | | | |
|---|---|---|---|---|
| 10,147,442 | B1* | 12/2018 | Panchapagesan | G10L 15/063 |
| 10,679,046 | B1* | 6/2020 | Black | G06T 17/00 |
| 10,915,798 | B1* | 2/2021 | Zhang | G06K 9/00308 |
| 2017/0364733 | A1* | 12/2017 | Estrada | G06N 3/0454 |
| 2018/0144185 | A1* | 5/2018 | Yoo | G06K 9/66 |
| 2019/0080205 | A1* | 3/2019 | Kaufhold | G06K 9/6257 |
| 2019/0197358 | A1* | 6/2019 | Madani | G06N 3/0481 |
| 2019/0228268 | A1* | 7/2019 | Zhang | G06N 3/0454 |
| 2020/0327418 | A1* | 10/2020 | Lyons | G06K 9/469 |

OTHER PUBLICATIONS

Alcorn, et al., "Strike (With) a Pose: Neural Networks Are Easily Fooled by Strange Poses of Familiar Objects"; In Proceedings of the IEEE/CVF Conference on Computer Vision and Pattern Recognition, Jun. 15, 2019, pp. 4840-4849.

(Continued)

*Primary Examiner* — Carol Wang
(74) *Attorney, Agent, or Firm* — Schwegman Lundberg & Woessner, P.A.

(57) ABSTRACT

A computer implemented method includes obtaining a first deep neural network (DNN) model trained on labeled real image data for a downstream vision task, obtaining a second DNN model trained on synthetic images created with random image parameter values for the downstream vision task, obtaining a third DNN model trained on the labeled real image data and the synthetic images for the downstream vision task, performing a forward pass execution of each model to generate a loss, backpropagating the loss to modify parameter values, and iterating the forward pass execution and backpropagating with images generated by the modified parameters to jointly train the models and optimize the parameters.

20 Claims, 4 Drawing Sheets

(56) References Cited

OTHER PUBLICATIONS

Kar, et al., "Meta-Sim: Learning to Generate Synthetic Datasets", In Proceedings of the IEEE/CVF International Conference on Computer Vision, Oct. 27, 2019, pp. 4550-4559.
Kato, et al., "Neural 3D Mesh Renderer", In Journal of the Computing Research Repository, Nov. 20, 2017, 18 Pages.
Liu, et al., "Adversarial Geometry and Lighting using a Differentiable Renderer", In Journal of the Computing Research Repository, Aug. 8, 2018, 18 Pages.
"International Search Report and the Written Opinion Issued in PCT Application No. PCT/US2020/037762", dated Oct. 2, 2020, 34 Pages.
Xiao, et al., "MeshAdv: Adversarial Meshes for Visual Recognition", In Proceedings of the IEEE/CVF Conference on Computer Vision and Pattern Recognition, Jun. 15, 2019, pp. 6891-6900.

* cited by examiner

MODEL-AWARE SYNTHETIC IMAGE GENERATION

BACKGROUND

Software for vision tasks utilizes machine learning. Machine learning models for vision related tasks such as image recognition are trained using labeled images. In other words, large amounts of images with labels identifying what is in the images are used to create the models. Once trained, the models are used for the vision tasks.

It can be very time consuming to obtain and label the large number of images that are needed for obtaining accurate models. Images that are created using computer software can be used to supplement the real images. Such computer created images are referred to as synthetic images. A problem with synthetic images is that there is a domain gap between real images and synthetic images such that the use of synthetic images to train a model can actually hurt the performance of the resulting model.

Synthetics images can differ from real images is because the are somehow "cleaner" than real images, since by definition they are the result of a simulation and the simulation cannot capture reality in all its complexity but only the most dominant aspects of it. The sampling accuracy of synthetic images is limited by the available compute power, there is a budget for how many sampling rays that can be sent into a scene for tracking and how many dispersion rays can be calculated. This can lead to inaccurately capturing high frequency details in the scene compared to real images where the sampling density and dispersion rate of photon particles is much higher. When the synthetic images are simulation are not close enough to reality, performance of the ML model will be impaired because the model will not be able to transfer what was learned from the synthetic images to reality. The model will not generalize.

SUMMARY

A computer implemented method includes obtaining a first deep neural network (DNN) model trained on labeled real image data for a downstream vision task, obtaining a second DNN model trained on synthetic images created with random image parameter values for the downstream vision task, obtaining a third DNN model trained on the labeled real image data and the synthetic images for the downstream vision task, performing a forward pass execution of each model to generate a loss, backpropagating the loss to modify parameter values, and iterating the forward pass execution and backpropagating with images generated by the modified parameters to jointly train the models and optimize the parameters.

DETAILED DESCRIPTION

Figure 1:
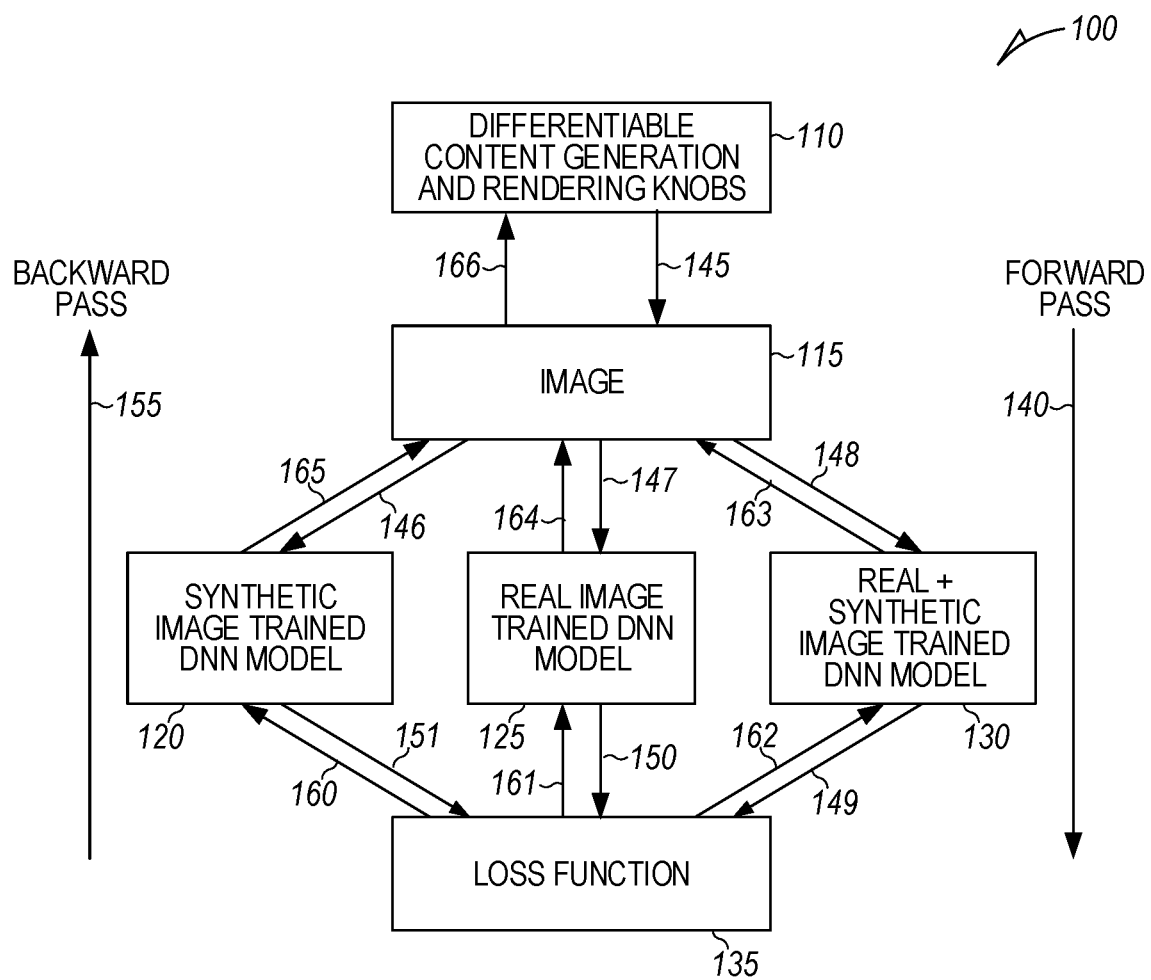
FIG. 1 is a block diagram illustrating an end-to-end synthetic image data generation framework according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Generated synthetic images to augment real data, such a labeled captured images, can improve deep neural network (DNN) based systems for vision task performance. Synthetic image generation involves both image content creation and graphics rendering. Content creation can involve creation of a 3D asset, as well as definition of object density, placement, motion trajectory, and other parameters of the image. Rendering also involves many parameters, such as texture, lighting, blurring, contrast, and others. Each of the parameters can be tunable. In order for synthetically generated images to be useful along with real image data for training DNN models, the synthetic images should match the real image data characteristics' distribution. Otherwise, a domain gap between the real data and the synthetic data may actually hurt model performance rather than improve model performance. This creates a challenge for synthetic image generation, as the number of parameters and settings for such parameters is very large. Many iterations of training a model using real and synthetic data may be required to improve downstream task performance.

Prior attempts to use synthetic images have separated synthetic image generation and DNN training. Synthetic images have been generated mostly manually or semi-manually with iterative training of the model with models selected based on model performance. Adversarial learning such as generative adversarial network (GAN) has also been used to learn transformation or mapping of pre-generated synthetic images to match the real image style or graphics distributions without changing image content. Such attempts are time consuming and may not result in improved models.

An improved method of generating synthetic images for training models is disclosed involving automatically generating and transforming synthetic images to close the domain gap with real images by using pretrained DNN models in a feedback loop to choose synthetic image generation parameters such that the parameter values improve downstream vision recognition tasks performed by a model trained using synthetic images generated using such parameters. Parameter values may be selected via the use of control knobs corresponding to each parameter. The parameters may include parameters related to both the synthetic image content and rendering of the synthetic images. The knobs are controls such as software-based mechanisms used to adjust the values of the parameters in a differentiable manner. In other words, the knobs provide a means for a linear or non-linear adjustment of the parameters.

FIG. 1 is a block diagram illustrating an end-to-end synthetic image data generation framework 100. Framework 100 automatically learns synthetic image content and rendering parameter values for generating and transforming synthetic and real images to close the domain gap between them by jointly optimizing DNN models. The result is a set of parameter values that can be used to greatly increase the number of synthetic images that can be generated and used for training models for vision related tasks.

Framework 100 includes a set of differentiable content generation and content rendering knobs 110. The knobs 110 are used to adjust various parameters related to content generation, such as for example object density, placement, and motion trajectory and other content generation knobs. The knobs 110 may also be used to adjust parameters related to content rendering, such as for example texture, lighting, blurring, contrast, and other parameters. The knobs map each parameter into a continuous space and are encoded into binary data and used as labels for synthetic images created and modified by the use of the knobs as indicated at images 115.

The images are used as input to multiple DNN models 120, 125, and 130 that have been pre-trained differently. Model 120 has been trained on synthetic image data. Model 125 has been trained on real image data, and model 130 has been trained on a combination of real image data and synthetic image data. Each of the images in the image data is labeled according to the vision task to be performed. Example vision tasks are unlimited in nature and may vary from autonomous vehicle applications to recognizing faces.

As the images are fed through the DNN models, performance data is collected from the models and provided to a loss function 135. This process is referred to as a forward pass as indicated by forward pass arrow 140 and arrows 145, 146, 147, 148, 149, 150, and 151 connecting the blocks in framework 100.

The loss function generates feedback for changing the behavior of the models and adjusting knobs to modify parameter values. The feedback is based on recognizing inferences of images by the models as compared to the labels of such images. The feedback is provided via backpropagation as indicated by an overall backpropagation arrow 155. Arrows 160, 161, 162, 163, 164, 165, and 166 illustrate the backpropagation flow between the blocks in the framework 100. In one embodiment, the back propagation is a form of gradient ascent with image constraints or object masks to maintain image content, location, etc.

For example, in order to find the right brightness of an image to detect an object, by backpropagating the difference between what the model predicts and the ground truth, the brightness knob is iteratively learned to be set to the values that can make the difference between prediction and ground truth smaller and smaller and eventually the object can be detected by the model using the ideal brightness values.

These modified parameter values are then applied to generate additional synthetic images. The additional synthetic images are used as the process iterates with repeated cycles of forward propagation 140 and back propagation 155.

Figure 2:
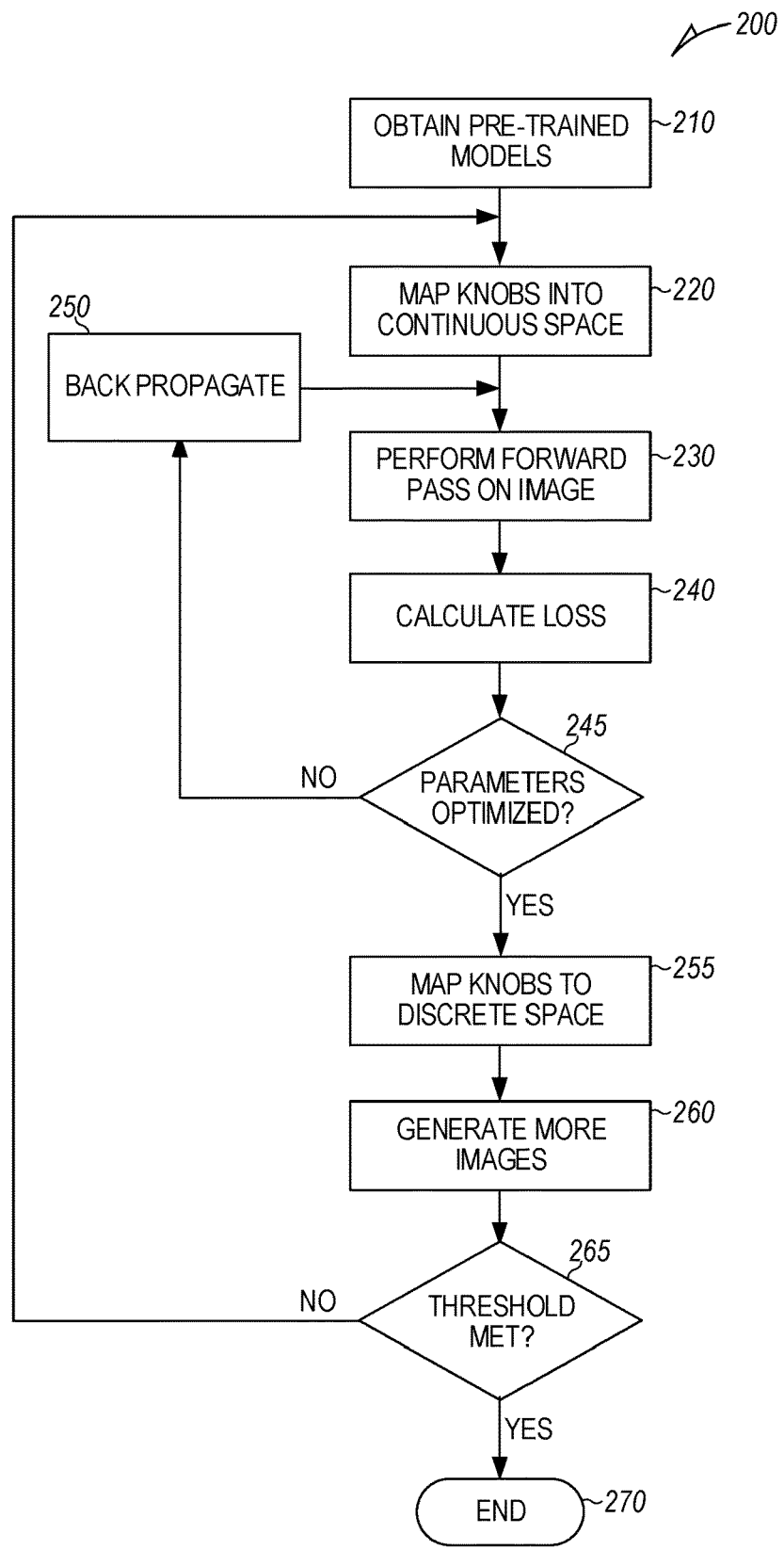
FIG. 2 is a flowchart illustrating an end-to-end computer implemented method of jointly optimizing DNN models for image related tasks according to an example embodiment.

FIG. 2 is a flowchart illustrating an end-to-end computer implemented method 200 of jointly optimizing DNN models for image related tasks. At operation 210, three DNN models are trained for a downstream vision task using synthetic data (random synthetics parameter values), real data and data comprising both synthetic and real data. The resulting models may be referred to as pretrained models. The training may be done well prior to performing further operations in method 200. At operation 220 discrete content generation and rendering knobs are mapped into continuous space so that they are differentiable.

For each real or synthetic image, a forward pass of each DNN model is performed at operation 230 to get the model execution path, neuron firing patterns, and downstream task prediction results. In one embodiment, a combination of downstream task metric, one or more of model execution path or neuron firing pattern or neuron coverage, one or more of content or mask constraint, pixel similarity (between real and synthetics) and model feature similarity across different models may be used as a loss function at operation 240. If the parameters are not optimized at 245, at operation 250, backpropagation is performed to change input values (while model parameters are fixed) and optimize synthetic knobs. Input values may be changed in the same manner as how general backpropagation works on updating neural network weight parameters. Input values are updated instead of neural network weights, i.e., input values are updated based on learning rate and the backpropagated data. A pre-determined threshold of loss values or their delta changes, or number of iterations derived empirically as a proxy may be used to determine that parameters are optimized. Jointly training models not only make sure their activation paths match so that model trained on synthetic and model trained on real match not just in terms of final predictions but also how the predictions are arrived.

Once the parameters are optimized as determined at operation 245, the optimized synthetics knobs are then mapped back to discrete space at operation 255 and applied at operation 260 to generate more synthetic images or used to transform real images to train the three DNN models and the process iterates until model performance improved by a predetermined threshold as determined at operation 265. If the threshold is met, method 200 ends at 270. In one embodiment, the threshold is set to 80 percent prediction accuracy. Other thresholds may be selected in further embodiments either based upon the particular accuracy needs of the vision task or user preferences. As an optimization step, retraining of the models or a search for all knobs in the whole design space is not required. Not all synthetics knobs and neurons or filters are equally sensitive to synthetics and real image domain gaps. In one embodiment, knobs or filters or neurons may be identified by techniques such as activation maximization maps between real and synthetic images. The knobs or filters or neurons with the largest distance or sensitivity with respect to the domain gap may then be selected for fine tuning using a combination of real or synthetic images. By looking at the degree of how each knob or filter or neuron affects the difference between real data trained model and synthetic data trained model, the most sensitive knobs may be identified.

As a side product, the above approach can also make the models more robust. By adjusting different knobs, identification of scenarios when the model fails under different content and rendering parameters may be identified, allowing generation of more synthetic data to augment these failure scenarios. Some example failure scenarios may be weather related, such as hail or fog. The size and density of the hail and the thickness or visibility measure of the fog may be controlled by respective knobs to generate more synthetic images for use in further iterations.

In various embodiments, a raytracing-based engine such as Optix, Cycle (Blender), Mental Ray, and V-Ray may be used to create virtual environments from which the synthetic images are created. In some embodiments, engines that use rasterization can be used such as Unreal, Unity, and CryEngine. Various knobs may be used to modify the content and rendering parameters. For instance, object libraries may be used to populate the virtual environment with content. The parameters that may be controlled by the knobs may include texture of a surface of the objects, light, swapping of objects from the library, framing of the virtual environment, type of lighting, intensity of lights, different materials, camera position, color, layout, size, appearance, and others.

Figure 3:
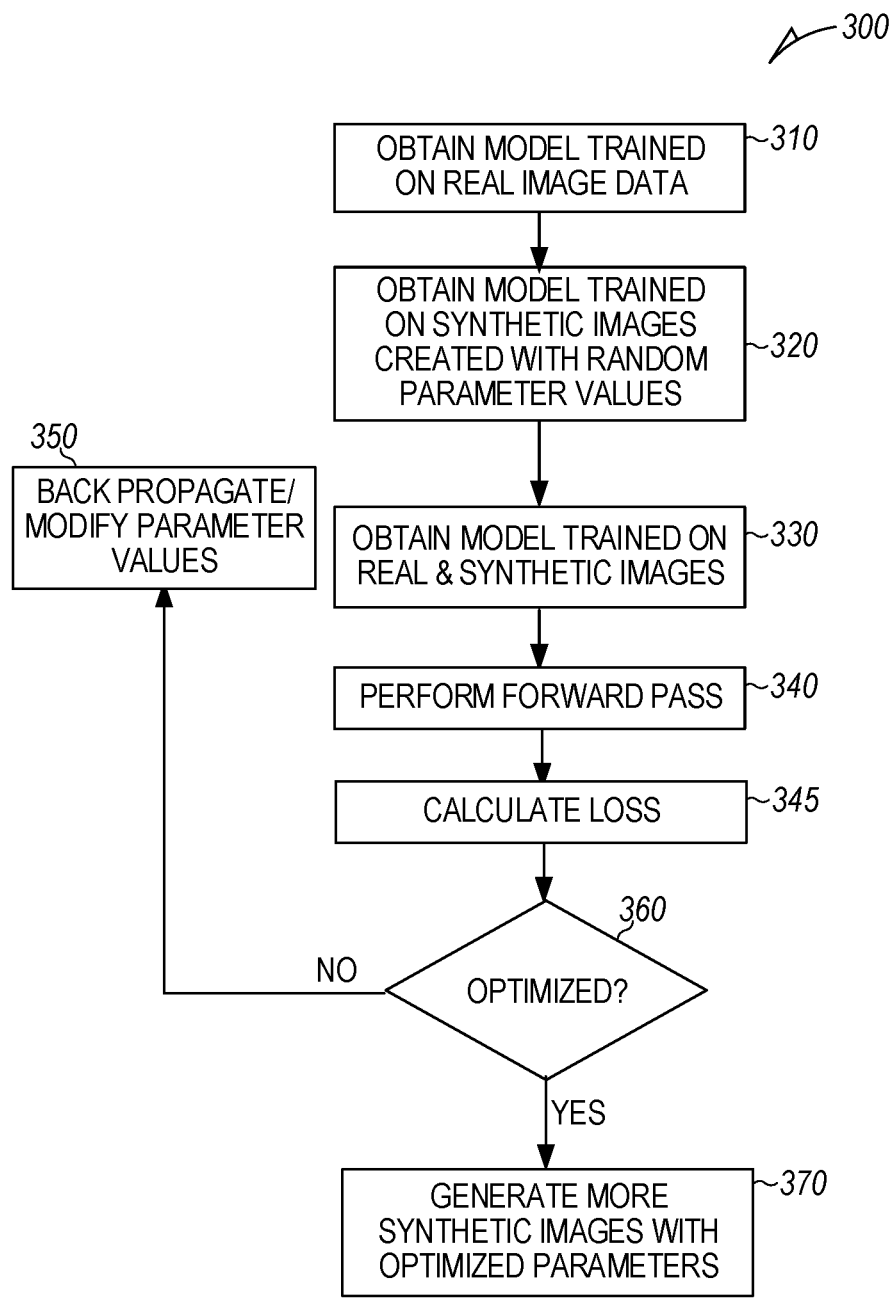
FIG. 3 is a flowchart illustrating a computer implemented method of optimizing knob parameters for creation of synthetic images that have characteristics suitable for use in training DNNs for vision related tasks according to an example embodiment.

FIG. 3 is a flowchart illustrating a computer implemented method 300 of optimizing knob parameters for creation of synthetic images that have characteristics suitable for use in training DNNs for vision related tasks. Method 300 begins at operation 310 by obtaining first deep neural network (DNN) model trained on labeled real image data for a downstream vision task. Obtaining such a model may be done by retrieving an already created model from a storage device or creating one in a normal fashion utilizing hundreds if not thousands of labeled images corresponding to the vision task. At operation 320, a second DNN model is obtained. The second DNN model is trained on synthetic images created with random image parameter values for the downstream vision task. In other words, images related to the downstream vision task are created by known means and are labeled appropriately. A third DNN model is also obtained at operation 330. The third DNN model is trained on the labeled real image data and the synthetic images for the downstream vision task.

At operation 340, a forward pass execution of each model is performed to generate a loss. The loss may be calculated by a loss function at operation 345 based on a combination of downstream vision task metrics and pixel similarity between real and synthetic images. As described above, the loss may be related to a combination of downstream task metric, model execution path or neuron firing pattern or neuron coverage, content or mask constraint, pixel similarity (between real and synthetics) and model feature similarity across different models.

Backpropagation is a technique whereby training data is fed forward through a neural network-here "forward" means that the data starts at the input neurons and follows the directed graph of neuron connections until the output neurons are reached—and the objective function is applied backwards through the neural network to correct the synapse weights. At each step in the backpropagation process, the result of the previous step is used to correct a weight. Thus, the result of the output neuron correction is applied to a neuron that connects to the output neuron, and so forth until the input neurons are reached.

The loss calculated at operation 245 is backpropagated at operation 350 to modify image generation parameter values. Model parameters may be fixed while backpropagating the loss. The forward pass execution and backpropagating with images generated by the modified parameters repeated or iterated at operation 360 to optimize the parameters. The parameters may comprise content generation parameters and rendering parameters in one embodiment. The parameters are modified by knobs that are mapped into a differentiable continuous space. The knobs corresponding to the optimized parameters are also mapped back to discrete space at operation 360. The discrete space mapped knobs may then be used to generate more synthetic images at operation 370 for use in creating a model for performing the vision task.

In one embodiment, the DNN models are further trained using the generated more synthetic images or real images, or a combination of synthetic and real images until a preselected model performance threshold is reached.

Figure 4:
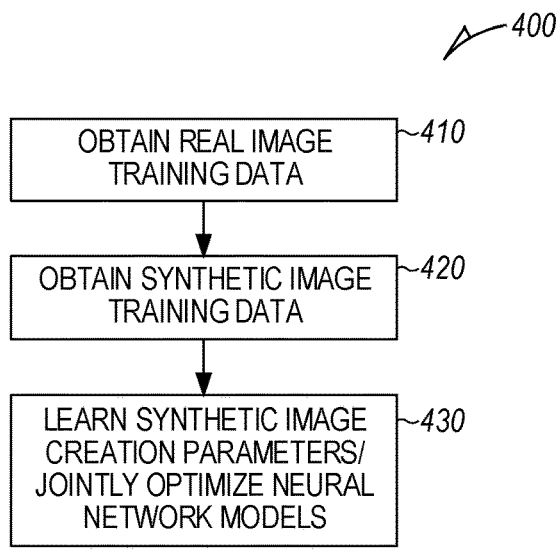
FIG. 4 is an alternative computer implemented method 400 of optimizing parameters for synthetic image generation according to an example embodiment.

FIG. 4 is an alternative computer implemented method 400 of optimizing parameters for synthetic image generation. Method 400 uses deep neural network models to optimize synthetic image generation and rendering parameters for vision related tasks to be performed by a machine learning model. At operation 410, real image training data is obtained. The real image data is labeled for the vision task. At operation 420, synthetic image training data is obtained. The synthetic image data may be created using image creation software that has multiple generation and rendering parameters that can be modified to modify the created images. Adversarial learning may be utilized at operation 430 to learn synthetic image rendering parameters to transform images to match characteristics of successful images.

At operation 430, pretrained deep neural network models corresponding to real image training data are jointly optimized by training all three models at the same time. The models are pretrained, respectively, based on synthetic image training data, real image data, and a combination or real image and synthetic image training data. In further embodiments, two neural network models, one containing synthetic image data and the other real image data may be used instead of three models.

A model for the vision task can be flexible and may be a design choice based on what the users want to achieve. The optimized knobs may be used to generate additional synthetic images. The model can be trained based on synthetic images generated using system 100 and real image data. In some embodiments, the the model may be trained using either only synthetic image data or only real image data only. In a further embodiment, a fusion of the loss of all three models in system 100, or the difference between synthetic data trained vs. real data trained models. The ability to generate additional synthetic images provides great flexibility for creating a model to perform a variety of image tasks.

Figure 5:
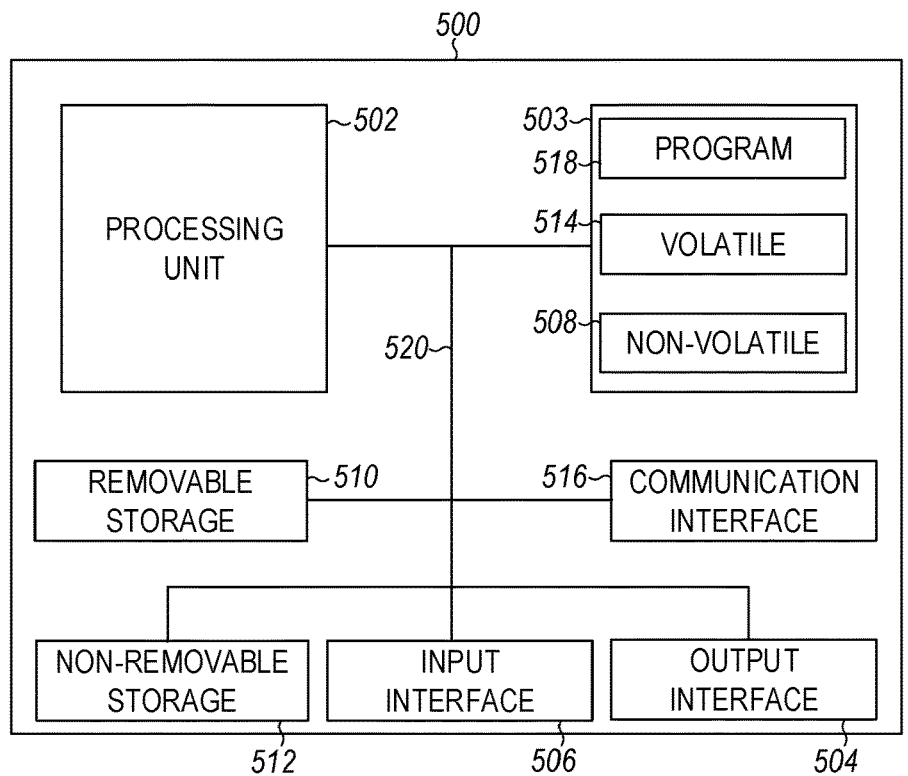
FIG. 5 is a block schematic diagram of a computer system to implement one or more example embodiments.

FIG. 5 is a block schematic diagram of a computer system 500 to optimize synthetic image generation and rendering parameters and for performing methods and algorithms according to example embodiments. All components need not be used in various embodiments.

One example computing device in the form of a computer 500 may include a processing unit 502, memory 503, removable storage 510, and non-removable storage 512. Although the example computing device is illustrated and described as computer 500, the computing device may be in different forms in different embodiments. For example, the computing device may instead be a smartphone, a tablet, smartwatch, smart storage device (SSD), or other computing device including the same or similar elements as illustrated and described with regard to FIG. 5. Devices, such as smartphones, tablets, and smartwatches, are generally collectively referred to as mobile devices or user equipment.

Although the various data storage elements are illustrated as part of the computer 500, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 500 may include or have access to a computing environment that includes input interface 506, output interface 504, and a communication interface 516. Output interface 504 may include a display device, such as a touchscreen, that also may serve as an input device. The input interface 506 may include one or more of a touchscreen, touchpad, mouse, keyboard, camera, one or more device-specific buttons, one or more sensors integrated within or coupled via wired or wireless data connections to the computer 500, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 500 are connected with a system bus 520.

Computer-readable instructions stored on a computer-readable medium are executable by the processing unit 502 of the computer 500, such as a program 518. The program 518 in some embodiments comprises software to implement one or more of the computer-implemented methods described herein to optimize parameter values and train machine learning models for vision related tasks. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 518 along with the workspace manager 522 may be used to cause processing unit 502 to perform one or more methods or algorithms described herein.

EXAMPLES

1. A computer implemented method includes obtaining a first deep neural network (DNN) model trained on labeled real image data for a downstream vision task, obtaining a second DNN model trained on synthetic images created with random image parameter values for the downstream vision task, obtaining a third DNN model trained on the labeled real image data and the synthetic images for the downstream vision task, performing a forward pass execution of each model to generate a loss, backpropagating the loss to modify parameter values, and iterating the forward pass execution and backpropagating with images generated by the modified parameters to jointly train the models and optimize the parameters.

2. The method of example 1 wherein the parameters comprise content generation parameters and rendering parameters.

3. The method of example 2 wherein the parameters are modified by knobs that are mapped into a differentiable continuous space.

4. The method of example 3 and further comprising mapping the knobs corresponding to the optimized parameters back to discrete space.

5. The method of example 4 and further comprising using the discrete space mapped knobs to generate additional synthetic images.

6. The method of any of examples 4-5 and further comprising training the DNN models using the generated additional synthetic images.

7. The method of example 6 and further comprising continuing to train the DNN models with the generated additional synthetic images until a pre-selected model performance threshold is reached.

8. The method of any of examples 4-7 wherein the more synthetic images are generated by transforming the real image data.

9. The method of any of examples 1-8 wherein the loss is calculated by a loss function based on a combination of downstream vision task metrics and pixel similarity between real and synthetic images.

10. The method of example 9 wherein the loss function is further based on one or more of model execution path or neuron firing pattern or neuron coverage, one or more of content or mask constraint, and model feature similarity across the models.

11. The method of any of examples 1-10 wherein the model parameters are fixed while backpropagating the loss.

12. A machine-readable storage device has instructions for execution by a processor of a machine to cause the processor to perform operations to perform a method. The operations include obtaining first deep neural network (DNN) model trained on labeled real image data for a downstream vision task, obtaining a second DNN model trained on synthetic images created with random image parameter values for the downstream vision task, obtaining a third DNN model trained on the labeled real image data and the synthetic images for the downstream vision task, performing a forward pass execution of each model to generate a loss, backpropagating the loss to modify parameter values, and iterating the forward pass execution and backpropagating with images generated by the modified parameters to jointly train the models and optimize the parameters.

13. The device of example 12 wherein the parameters comprise content generation parameters and rendering parameters that are modified by knobs that are mapped into a differentiable continuous space.

14. The device of example 13 wherein the operations further comprise mapping the knobs corresponding to the optimized parameters back to discrete space.

15. The device of example 14 wherein the operations further comprise using the discrete space mapped knobs to generate additional synthetic images.

16. The device of any of examples 14-15 wherein the operations further comprise training the DNN models using the generated additional synthetic images and continuing to train the DNN models with the generated additional synthetic images until a pre-selected model performance threshold is reached.

17. The device of any of examples 12-16 wherein the loss is calculated by a loss function based on a combination of downstream vision task metrics and pixel similarity between real and synthetic images.

18. The device of example 17 wherein the loss function is further based on one or more of model execution path or neuron firing pattern or neuron coverage, one or more of content or mask constraint, and model feature similarity across the models and wherein model parameters are fixed while backpropagating the loss.

19. A device includes a processor and a memory device coupled to the processor and having a program stored thereon for execution by the processor to perform operations. The operations include obtaining first deep neural network (DNN) model trained on labeled real image data for a downstream vision task, obtaining a second DNN model trained on synthetic images created with random image parameter values for the downstream vision task, obtaining a third DNN model trained on the labeled real image data and the synthetic images for the downstream vision task, performing a forward pass execution of each model to generate a loss, backpropagating the loss to modify parameter values, and iterating the forward pass execution and backpropagating with images generated by the modified parameters to jointly train the models and optimize the parameters.

20. The device of example 19 wherein the parameters comprise content generation parameters and rendering parameters that are modified by knobs that are mapped into a differentiable continuous space and wherein the operations further comprise training the DNN models using the generated additional synthetic images and continuing to train the DNN models with the generated additional synthetic images until a pre-selected model performance threshold is reached, wherein the loss is calculated by a loss function based on a combination of downstream vision task metrics and pixel similarity between real and synthetic images.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
obtaining a first deep neural network (DNN) model trained on labeled real image data for a downstream vision task;
obtaining a second DNN model trained on synthetic images created with random image parameter values for the downstream vision task;
obtaining a third DNN model trained on the labeled real image data and the synthetic images for the downstream vision task;
performing a forward pass execution of each model to generate a loss;
backpropagating the loss to modify parameter values; and
iterating the forward pass execution and backpropagating with images generated by the modified parameter values to jointly train the models and optimize parameters.

2. The method of claim 1 wherein the parameters comprise content generation parameters and rendering parameters.

3. The method of claim 2 wherein the parameters are modified by knobs that are mapped into a differentiable continuous space.

4. The method of claim 3 and further comprising mapping knobs corresponding to the optimized parameters back to discrete space.

5. The method of claim 4 and further comprising using the discrete space mapped knobs to generate additional synthetic images.

6. The method of claim 4 and further comprising training the DNN models using the generated additional synthetic images.

7. The method of claim 6 and further comprising continuing to train the DNN models with the generated additional synthetic images until a pre-selected model performance threshold is reached.

8. The method of claim 4 wherein the synthetic images are generated by transforming the real image data.

9. The method of claim 1 wherein the loss is calculated by a loss function based on a combination of downstream vision task metrics and pixel similarity between real and synthetic images.

10. The method of claim 9 wherein the loss function is further based on one or more of a model execution path, a neuron firing pattern, or a neuron coverage, one or more of a content or mask constraint, and a model feature similarity across the models.

11. The method of claim 1 wherein model parameters are fixed while backpropagating the loss.

12. A machine-readable storage device having instructions for execution by a processor of a machine to cause the processor to perform operations to perform a method, the operations comprising:
   obtaining first deep neural network (DNN) model trained on labeled real image data for a downstream vision task;
   obtaining a second DNN model trained on synthetic images created with random image parameter values for the downstream vision task: obtaining a third DNN model trained on the labeled real image data and the synthetic images for the downstream vision task;
   performing a forward pass execution of each model to generate a loss;
   backpropagating the loss to modify parameter values; and
   iterating the forward pass execution and backpropagating with images generated by the modified parameter values to jointly train the models and optimize parameters.

13. The device of claim 12 wherein the parameters comprise content generation parameters and rendering parameters that are modified by knobs that are mapped into a differentiable continuous space.

14. The device of claim 13 wherein the operations further comprise mapping knobs corresponding to the optimized parameters back to discrete space.

15. The device of claim 14 wherein the operations further comprise using the discrete space mapped knobs to generate additional synthetic images.

16. The device of claim 14 wherein the operations further comprise training the DNN models using the generated additional synthetic images and continuing to train the DNN models with the generated additional synthetic images until a pre-selected model performance threshold is reached.

17. The device of claim 12 wherein the loss is calculated by a loss function based on a combination of downstream vision task metrics and pixel similarity between real and synthetic images.

18. The device of claim 17 wherein the loss function is further based on one or more of a model execution path, a neuron firing pattern, or a neuron coverage, one or more of a content or mask constraint, and a model feature similarity across the models and wherein model parameters are fixed while backpropagating the loss.

19. A device comprising:
   a processor; and
   a memory device coupled to the processor and having a program stored thereon for execution by the processor to perform operations comprising:
      obtaining first deep neural network (DNN) model trained on labeled real image data for a downstream vision task;
      obtaining a second DNN model trained on synthetic images created with random image parameter values for the downstream vision task;
      obtaining a third DNN model trained on the labeled real image data and the synthetic images for the downstream vision task;
      performing a forward pass execution of each model to generate a loss; backpropagating the loss to modify parameter values; and
      iterating the forward pass execution and backpropagating with images generated by the modified parameter values to jointly train the models and optimize parameters.

20. The device of claim 19 wherein the parameters comprise content generation parameters and rendering parameters that are modified by knobs that are mapped into a differentiable continuous space and wherein the operations further comprise training the DNN models using generated additional synthetic images and continuing to train the DNN models with the generated additional synthetic images until a pre-selected model performance threshold is reached, wherein the loss is calculated by a loss function based on a combination of downstream vision task metrics and pixel similarity between real and synthetic images.

* * * * *